May 15, 1923.                    1,455,698
J. J. ABRAHAMS
HOOK AND EYE
Filed Jan. 16, 1922
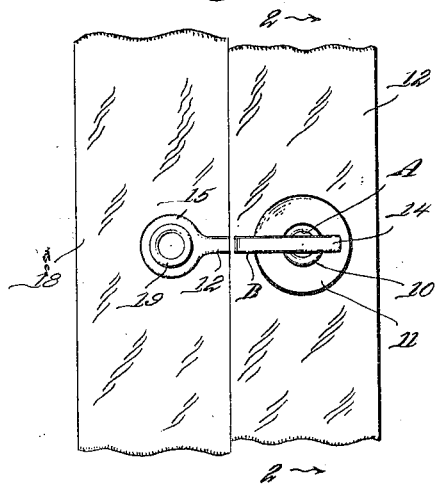
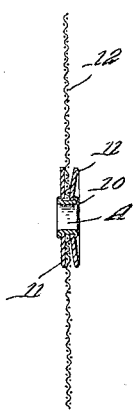
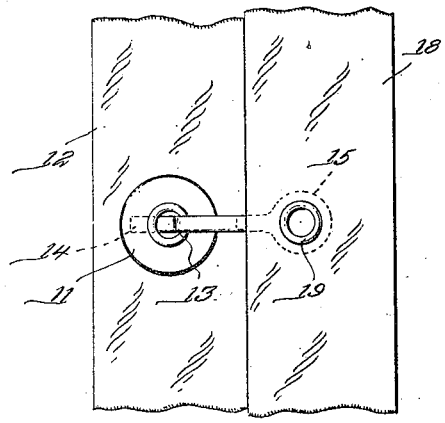
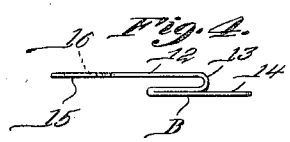
John J. Abrahams
INVENTOR
BY Victor J. Evans
ATTORNEY
WITNESS:

Patented May 15, 1923.

1,455,698

UNITED STATES PATENT OFFICE.

JOHN J. ABRAHAMS, OF GRAND RAPIDS, MICHIGAN.

HOOK AND EYE.

Application filed January 16, 1922. Serial No. 529,602.

*To all whom it may concern:*

Be it known that I, JOHN J. ABRAHAMS, a citizen of the United States, residing at Grand Rapids, in the county of Kent and State of Michigan, have invented new and useful Improvements in Hooks and Eyes, of which the following is a specification.

This invention comprehends the provision of a hook and eye, both of which are of novel construction and designed to prevent casual separation of the said parts when the latter are associated.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a view showing the hook and eye associated.

Figure 2 is a sectional view taken on line 2—2 of Figure 1.

Figure 3 is a bottom plan view of the eye.

Figure 4 is a detail view of the hook.

Referring to the drawing in detail, A indicates the eye, while the hook is indicated at B. The eye includes an eyelet of any well-known construction indicated at 10, which is reinforced by disks 11 arranged at the opposite sides of the material 12' with which the eye is associated. In addition to reinforcing the eye, the disks are further utilized to prevent the hook B from wearing the material 11 by keeping the hook from coming in contact with the material incident to the association of or separation of the hook and eye. The disk 11 at one side of the material is slightly concaved to facilitate the association of the parts and at the same time assist in holding the parts against casual separation.

The hook B is formed from a single length of material 12 which is bent upon itself to provide a bill 13, the latter being bent in a reverse direction to provide a tongue 14 which extends a slight distance beyond the bill of the hook. The opposite end of the hook or material 12 from which the hook is formed is enlarged as at 15 and provided with an opening 16 through which the eyelet or any other suitable means may be used for securing the hook to the fabric 18. The eyelet in this particular instance, is indicated at 19.

In practice, when it is desired to associate the hook with the eye, the hook is arranged at a right angle to the eye and passed through the latter from one side of the eye, and subsequently arranged obliquely to the eye, so that it can be moved to lie substantially flat with the eye positioned within the bill of the hook. When so arranged as shown in Figure 1, the bill of the hook projects beyond one side of the adjacent disk 11, while the tongue projects in an opposite direction beyond the opening of the eye, so that it is practically impossible for the hook to become casually separated from the eye when desired, by arranging the hook at a right angle to the eye and then passing it through the latter.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

As a new article of manufacture, a hook formed from a single piece of material, an enlarged apertured end portion, and a tongue forming a continuation of the bill of the hook and projecting therefrom in a reversed direction for the purpose specified.

JOHN J. ABRAHAMS.